(12) United States Patent
Mazor et al.

(10) Patent No.: US 8,568,625 B2
(45) Date of Patent: Oct. 29, 2013

(54) AQUEOUS DISPERSION OF FLAME RETARDANT FOR TEXTILES AND PROCESS FOR PRODUCING SAME

(75) Inventors: Royi Mazor, Kibbutz Bet Kama (IL); Itzhak Shalev, Bet Gamliel (IL); Nirit Zer-Zion, Beer-Sheva (IL)

(73) Assignee: Bromine Compounds Ltd., Beer Sheva (IL)

( * ) Notice: Subject to any disclaimer, the term of this patent is extended or adjusted under 35 U.S.C. 154(b) by 946 days.

(21) Appl. No.: 11/578,922

(22) PCT Filed: Apr. 7, 2005

(86) PCT No.: PCT/IL2005/000379
§ 371 (c)(1),
(2), (4) Date: Dec. 4, 2006

(87) PCT Pub. No.: WO2005/103361
PCT Pub. Date: Nov. 3, 2005

(65) Prior Publication Data
US 2009/0250671 A1    Oct. 8, 2009

(30) Foreign Application Priority Data

Apr. 26, 2004  (IL) .......................................... 161636

(51) Int. Cl.
*C08K 3/10*   (2006.01)

(52) U.S. Cl.
USPC ............ 252/608; 524/409; 524/492; 524/493

(58) Field of Classification Search
USPC ....................................................... 252/608
See application file for complete search history.

(56) References Cited

U.S. PATENT DOCUMENTS

| | | |
|---|---|---|
| 3,955,032 A | 5/1976 | Mischutin |
| 3,974,310 A | 8/1976 | Mischutin |
| 4,120,798 A | 10/1978 | Mischutin |
| 4,600,606 A | 7/1986 | Mischutin |
| 4,623,583 A | 11/1986 | Mischutin |
| 5,468,424 A | 11/1995 | Wienckoski |
| 5,498,714 A | 3/1996 | Nishibori et al. |
| 5,773,501 A | 6/1998 | Watanabe et al. |
| 5,811,040 A | 9/1998 | Mallonee |
| 6,033,731 A * | 3/2000 | Liebert et al. ................. 427/244 |
| 6,080,796 A | 6/2000 | Liebert et al. |
| 6,610,214 B2 * | 8/2003 | Goldenhersh et al. ....... 252/8.61 |
| 6,737,456 B2 | 5/2004 | Bar-Yakov et al. |
| 2002/0002221 A1 * | 1/2002 | Lee .................. 524/93 |
| 2002/0035186 A1 * | 3/2002 | Ona et al. ...................... 524/409 |
| 2002/0099253 A1 * | 7/2002 | Terada et al. ................. 588/206 |
| 2002/0169240 A1 * | 11/2002 | Bar-Yakov et al. ........... 524/136 |
| 2004/0121114 A1 | 6/2004 | Piana et al. |

FOREIGN PATENT DOCUMENTS

| | | |
|---|---|---|
| GB | 2001115 | 1/1979 |
| JP | 02196867 | 8/1990 |
| JP | H07-025861 | 1/1995 |
| JP | H07-268765 | 10/1995 |
| JP | 2002-119409 | 4/2002 |
| JP | 2002-327372 | 11/2002 |
| JP | 2004-050649 | 2/2004 |
| WO | 2009093234 | 7/2009 |

OTHER PUBLICATIONS

International Preliminary Report on Patentability from corresponding PCT application—6 pages, Nov. 1, 2006.
Karen, E. Haneke, "Tetrabromobisphenal Abis (2,3-dibromopropyl ether) [21850-44-2] Review of Toxicological Literature November" Nov. 1, 2002 XP002688273; Submitted by Karen E. Haneke, M.S.; Integrated Laboratory Systems, Inc. P.O. Box 13501 Research Triangle Park, North Carolina 27709 (40 pages).
Supplementary European Search Report of corresponding European application; Dec. 10, 2012 (4 pages).
Toxicological Risks of Selected Flame-Retardant Chemicals (2000), Donald E. Gardner (Chair) Subcommittee on Flame-Retardant Chemicals, National Research Council p. 507.

* cited by examiner

*Primary Examiner* — Ling Choi
*Assistant Examiner* — Monique Peets
(74) *Attorney, Agent, or Firm* — Roach Brown McCarthy & Gruber, P.C.; Kevin D. McCarthy

(57) ABSTRACT

Flame retardant aqueous dispersions or suspensions comprising tris(tribromophenoxy)-s-triazine (TTBT) or tetrabromobisphenol A bis(2,3-dibromopropyl ether) (TBBPE) or a mixture thereof and one or more nonionic or anionic surface active agent(s) and/or wetting agent(s) used in textile are described. The flame retardants exhibit high compatibility with textile materials and are stable in aqueous solutions.

5 Claims, No Drawings

AQUEOUS DISPERSION OF FLAME RETARDANT FOR TEXTILES AND PROCESS FOR PRODUCING SAME

FIELD OF THE INVENTION

The present invention relates to flame retardant aqueous dispersions that are used in textile. More particularly, the invention relates to the use of flame retardants which exhibit a high compatibility with textile materials and which are stable in aqueous solution.

BACKGROUND OF THE INVENTION

Flame retardation of textiles using aromatic bromine-containing formulations adhered to the substrates by means of binders, has been long established (for instance, U.S. Pat. No. 3,955,032 and U.S. Pat. No. 4,600,606). The main drawbacks of existing formulations include high bromine content demand, high dry add-on demand, streak marks on dark fabrics, excessive dripping during combustion of thermoplastic fibers and dispersion instability. Most of these drawbacks are inherent to the aromatic bromine compounds used.

Using existing aromatic bromine containing formulations, the percentage resin component may be as high as 60-70 wt % of the total add-on in order to obtain satisfactory flame retardation (see Toxicological Risks of Selected Flame-Retardant Chemicals (2000), by Donald E. Gardner (Chair) Subcommittee on Flame-Retardant Chemicals, Committee on Toxicology, Board on Environmental Studies and Toxicology, National Research Council page 507). This high add-on is due in part to the large amount of binder needed to fix the flame retardant (FR) agents to the textile. The binder may be as high as 50 wt % of the total FR formulation (see Toxicological Risks of Selected Flame-Retardant Chemicals (2000) page 507). Due to its substantial presence, the binder contributes to flammability and dripping, which requires more bromine content, thus creating an inefficient cycle. In order to obtain flame retarded textiles with better performance and less detriment to textile properties, an efficient FR agent conducive to incorporation in low binder content formulations with good dispersion properties is required.

Tris(tribromophenoxy)-s-triazine (FR-245) is a flame retardant with a combination of aromatic bromine and cyanurate that provides high FR efficiency and good thermal stability. In its non-micronized form it is useful in many applications, especially but not exclusively, in the field of fire retardants for plastic compositions. FR-245 is insoluble in water but has a specific gravity of about 2.4, significantly lower than bromine rich FR agents commonly used in such applications such as Decabromodiphenyl Oxide (Deca), which has a specific gravity of 3. FR-245 is also easily micronized. Therefore, FR-245 lends itself to the preparation and use of more stable aqueous dispersions. FR-245 also has a higher initial decomposition temperature than Decabromodiphenyl oxide.

Tetrabromobisphenol A bis(2,3-dibromopropyl ether) (FR-720) is a flame retardant with a combination of aromatic and aliphatic bromine that provides high FR efficiency and good thermal stability. FR-720 is useful in many applications, especially but not exclusively, in the field of fire retardants for plastic compositions. FR-720 is insoluble in water but has a specific gravity of about 2.3, significantly lower than bromine rich FR agents commonly used in such applications such as Decabromodiphenyl Oxide (Deca). FR-720 has an advantage in that a homogenous film can be achieved during the application due to its low melting range (113-117° C.) which enables melt penetration of the material being processed.

It has now been surprisingly found, and this is an object of the present invention, that two specific aromatic flame-retardants, never tested before in textile, possess unexpected stability and compatibility properties, which render them highly efficient for the purpose of flame-retarding textile materials.

It is thus a purpose of this invention to provide stable dispersions or suspensions of A) tris(tribromophenoxy)-s-triazine or B) tetrabromobisphenol A bis(2,3-dibromopropyl ether), or of mixtures thereof, which alleviate the drawbacks of existing formulations for treating textile materials.

It is another purpose of this invention to provide such dispersions or suspensions that are aqueous dispersions or suspensions and which do not require non-aqueous solvents.

It is a further purpose of this invention to provide a process for preparing such aqueous dispersions or suspensions.

It is yet another purpose of the invention to provide dispersions of tris(tribromophenoxy)-s-triazine or tetrabromobisphenol A bis(2,3-dibromopropyl ether) or of a blend of tris(tribromophenoxy)-s-triazine and tetrabromobisphenol A bis(2,3-dibromopropyl ether) for particular uses in the textile industry by coating and/or padding and/or foaming and/or spraying application.

It is still a further purpose of the invention to provide dispersions of tris(tribromophenoxy)-s-triazine or tetrabromobisphenol A bis(2,3-dibromopropyl ether) or a blend of tris(tribromophenoxy)-s-triazine and tetrabromobisphenol A bis(2,3-dibromopropyl ether) together with additional compounds, such as synergists for increasing the fire-retarding efficiency of compositions obtained from these flame retardants.

It is still another purpose of the invention to provide dispersions of tris(tribromophenoxy)-s-triazine or tetrabromobisphenol A bis(2,3-dibromopropyl ether) or a blend of tris (tribromophenoxy)-s-triazine and tetrabromobisphenol A bis (2,3-dibromopropyl ether) with significantly reduced amounts of binder content.

It is also a purpose of the invention to produce a smooth, translucent coating of tris(tribromophenoxy)-s-triazine or tetrabromobisphenol A bis(2,3-dibromopropyl ether) or a blend of tris(tribromophenoxy)-s-triazine and tetrabromobisphenol A bis(2,3-dibromopropyl ether) on textile materials, when applied in aqueous solution.

Other purposes and advantages of the invention will become apparent as the description proceeds.

SUMMARY OF THE INVENTION

The dispersion of tris(tribromophenoxy)-s-triazine or tetrabromobisphenol A bis(2,3-dibromopropyl ether) or a blend of tris(tribromophenoxy)-s-triazine and tetrabromobisphenol A bis(2,3-dibromopropyl ether), according to the invention, is characterized in that it comprises one or both of the above flame retardants, or mixtures thereof, and contains nonionic or anionic surface-active agents or wetting agents.

The nonionic or anionic surface-active agents or wetting agents useful in the invention are well known in the art and can be chosen by the skilled person without the need for experimentation. Illustrative and non-limitative examples of nonionic agents include, for instance, polyoxyethylene (POE) alkyl ether type, preferably NP-6 (Nonylphenol ethoxylate, 6 ethyleneoxide units).

Illustrative and non-limitative examples of anionic agents include, for instance, free acids or organic phosphate esters or the dioctyl ester of sodium sulfosuccinic acid.

The dispersion of the invention may also include other additives which function both as dispersing agents and suspending agents and which are commonly used by persons skilled in the art, such as acrylic acids/acrylic acids ester copolymer neutralized—sodium polycarboxyl, preferably naphthalene sulfonic acid—formaldehyde condensate sodium salt.

The suspension according to the invention may also include defoaming or antifoaming agents, which are well known to persons skilled in the art. These may include, for example, emulsion of mineral oils or emulsion of natural oils or preferably emulsion of silicon oils like AF-52™.

The suspension according to the invention may also include binder agents, which are well known to persons skilled in the art. These may include, a polymer latex emulsion comprising of any acrylic co-monomers. For example, acrylic acid and methacrylic acid or their derivatives such as esters, nitriles and amides can be employed. The esters are preferred compounds. Specific examples of the acrylates that can be utilized are methyl acrylate, ethyl acrylate, ethyl methacrylate, propyl acrylate, propyl methacrylate, butyl acrylate, isobutyl acrylate, isobutyl methacrylate, amyl acrylate, 2-ethylhexyl acrylate, cyclohexyl acrylate, vinyl acrylate, allyl acrylate, hydroxyethyl acrylate, perfluoroethyl acrylate, isobornyl acrylate, phenoxyethyl acrylate, tetraethylene glycol diacrylate, tripropylene glycol diacrylate, trimethylolpropane triacrylate, stearyl acrylate or stearyl methacrylate, acrylamide, methacrylamide, N—($C_1$-$C_8$-alkyl acrylamides or—methacrylamides. A single acrylate or various combinations of acrylates can be employed in making the copolymers. In addition, other co-monomers may be employed in the copolymer latex including vinyl esters of saturated $C_1$-$C_{18}$-carboxylic acids, such as vinyl acetate, vinyl propionate, vinyl butyrate or vinyl stearate, styrene, phenoxyethyl acrylate, hydroxyalkylene monoacrylic esters and hydroxyalkylene monomethacrylic esters or acrylic esters and methacrylic esters of ethoxylated $C_1$-$C_{18}$-alcohols.

Other suitable illustrative textile binders are Acrylonitile-Butadiene-Styrene Copolymer, Polychloroprene Rubber and Carboxylated styrene butadiene rubber Polyurethane Preserving or stabilizing agents such as formaldehyde, and preferably a mixture of methyl and propyl hydroxy benzoates, can also be added to the dispersion.

According to a preferred embodiment of the invention, dispersions of tris(tribromophenoxy)-s-triazine or tetrabromobisphenol A bis(2,3-dibromopropyl ether) or a blend of tris(tribromophenoxy)-s-triazine and tetrabromobisphenol A bis(2,3-dibromopropyl ether) are mixed together with additional compounds—such as fire-retardant synergists, e.g. fire-retardant antimony oxide (AO).

According to another preferred embodiment of the invention dispersions of tris(tribromophenoxy)-s-triazine or tetrabromobisphenol A bis(2,3-dibromopropyl ether) or a blend of tris(tribromophenoxy)-s-triazine and tetrabromobisphenol A bis(2,3-dibromopropyl ether) are incorporated in formulations with typically 30% or less, preferably 27% or less binder by weight.

According to still another preferred embodiment of the invention, formulations of tris(tribromophenoxy)-s-triazine or tetrabromobisphenol A bis(2,3-dibromopropyl ether) or a blend of tris(tribromophenoxy)-s-triazine and tetrabromobisphenol A bis(2,3-dibromopropyl ether) are used to impart satisfactory flame retardancy to textiles with less than 60% dry add-on, preferably 50% dry add-on, most preferably with 40% dry add-on by weight.

According to yet another preferred embodiment of the invention formulations of tris(tribromophenoxy)-s-triazine or tetrabromobisphenol A bis(2,3-dibromopropyl ether) or a blend of tris(tribromophenoxy)-s-triazine and tetrabromobisphenol A bis(2,3-dibromopropyl ether) are used to impart satisfactory flame retardancy to textiles after washing with detergent.

According to a preferred embodiment of the invention formulations of tris(tribromophenoxy)-s-triazine or tetrabromobisphenol A bis(2,3-dibromopropyl ether) or a blend of tris(tribromophenoxy)-s-triazine and tetrabromobisphenol A bis(2,3-dibromopropyl ether) are used to impart a smooth, translucent, non streaky coating on the textile substrates.

The dispersions, in particular the aqueous dispersions, of the invention are stable. When stored at room temperature, they are stable for at least two weeks and preferably at least one month. Their stability may be higher, e.g. three months or more.

The above and other characteristics and advantages of the invention will be better understood through the following illustrative and non-limitative detailed description of preferred embodiments thereof, with reference to the following examples.

EXAMPLE 1

Preparation of a Dispersion of Tris(Tribromophenoxy)-s-triazine (FR-245)

248 gr. of FR-245 with a size distribution ranging from 0.1 micron to 20 microns was added drop-wise to a mixed solution of 164 gr. of deionized water and 25 gr. of dispersing agent. 100 gr. $Sb_2O_3$ was added to the mixed dispersion. The dispersion was allowed to mix for fifteen minutes. About 5 gr. of acrylic thickener was added during mixing and the dispersion was neutralized to pH=7 using ammonium hydroxide. The composition of the dispersion is detailed in Table I below.

TABLE I

| Dispersion | |
|---|---|
| Viscosity (cP) | 40 000 |
| PH | 7 |
| FR in dispersion (wt %) | 45.8 |
| Br in dispersion (wt %) | 30.7 |
| $Sb_2O_3$ in dispersion (wt %) | 18.5 |

The FR-245 dispersion was smooth, white and had good fluidity. The dispersion was left on a shelf for 6 months and remained stable (no settling was observed) during this period.

EXAMPLE 2

Preparation of a Formulation of FR-245

58 gr. of deionized water and 58 gr. of acrylic binder were added to 79 gr. of dispersion from Example 1. 19 gr. of acrylic thickener was added while mixing and the dispersion was neutralized to pH=7-8 using ammonium hydroxide. Details of the dispersion are given in Table II below.

TABLE II

| Dispersion | |
|---|---|
| Viscosity (cP) | 28000 |
| PH | 7-8 |
| FR in dispersion (wt %) | 16.8 |

TABLE II-continued

| Dispersion | |
|---|---|
| Br in dispersion (wt %) | 11.3 |
| $Sb_2O_3$ in dispersion (wt %) | 6.8 |

This formulation contained 27% by weight of binder, 16.8 wt % FR agent and 11.3 wt % bromine content. The FR-245 formulation was smooth, white and had good fluidity. The dispersion was left on a shelf for 6 months and remained stable (no settling was observed) during this period.

EXAMPLE 3

Application of FR-245 Formulation to Polyester Fabric

Polyester fabric weighing 164 grams per square meter was coated using a knife coater with the formulation from Example 2 to 57.7% dry add-on and cured. The fabric passed ASTM D 6413-99 with negligible dripping. The fabric was translucent with no visible streak marks.

EXAMPLE 4

Application of FR-245 Formulation to Polyester Fabric

Polyester fabric weighing 164 grams per square meter was coated using a knife coater with the formulation from Example 2 to 40% dry add-on and cured. The fabric passed ASTM D 6413-99 with negligible dripping. The fabric was translucent with no visible streak marks.

EXAMPLE 5

Application of FR-245 Formulation to Polyester Fabric

Polyester fabric weighing 164 grams per square meter was coated using a knife coater with the formulation from Example 2 to 40% dry add-on and cured. The fabric was washed with 1 gram per liter standard detergent at 80° C. for 30 minutes and dried. The fabric passed ASTM D 6413-99 with negligible dripping. The fabric was translucent with no visible streak marks.

EXAMPLE 6

Preparation of a Dispersion of Tetrabromobisphenol A bis(2,3-dibromopropyl Ether) (FR-720)

248 gr. of FR-720 was added drop-wise to a mixed solution of 241 gr. of deionized water and 36 gr. of dispersing agents. 100 gr. $Sb_2O_3$ was added to the mixed dispersion. The dispersion was allowed to mix for fifteen minutes. About 7.3 gr. of acrylic thickener was added during mixing and the dispersion is neutralized to pH=7 using ammonium hydroxide. Details of the dispersion are given in Table III below.

TABLE III

| Dispersion | |
|---|---|
| Viscosity (cP) | 40 000 |
| PH | 7 |
| FR in dispersion (wt %) | 39.2 |

TABLE III-continued

| Dispersion | |
|---|---|
| Br in dispersion (wt %) | 26.5 |
| $Sb_2O_3$ in dispersion (wt %) | 15.8 |

The FR-720 dispersion was smooth, white and had good fluidity. The dispersion was left on a shelf for 6 months and remained stable (no settling was observed) during this period.

EXAMPLE 7

Preparation of a Formulation of FR-720

140 gr. of deionized water and 145 gr. of acrylic binder were added to 198 gr. of dispersion from Example 6. 18.4 gr. of acrylic thickener was added during mixing and the dispersion was neutralized to pH=7-8 using ammonium hydroxide. Details of the dispersion are given in Table IV below.

TABLE IV

| Dispersion | |
|---|---|
| Viscosity (cP) | 16400 |
| PH | 7-8 |
| FR in dispersion (wt %) | 15.9 |
| Br in dispersion (wt %) | 10.7 |
| $Sb_2O_3$ in dispersion (wt %) | 6.4 |

This formulation contained 34.2% by weight of binder, 15.9% FR agent and 10.7% bromine content. The formulation was smooth, white and had good fluidity. The dispersion was left on a shelf for 6 months and remained stable (no settling was observed) during this period.

EXAMPLE 8

Application of FR-720 Formulation to Polyester Fabric

Polyester fabric weighing 164 grams per square meter was coated using a knife coater with the formulation from Example 7 to 35% dry add-on and cured. The fabric passed ASTM D 6413-99 with negligible dripping. The fabric was translucent with no visible streak marks.

EXAMPLE 9

Preparation of a Dispersion of FR-245/FR-720 Blend 248 gr. of FR-245/FR-720 1:1 blend was added drop-wise to a mixed solution of 315 gr. of deionized water and 25 gr. of dispersing agent. 100 gr. $Sb_2O_3$ was added to the mixed dispersion. The dispersion was allowed to mix for fifteen minutes. About 6.6 gr. of acrylic thickener was added during mixing and the dispersion was neutralized to pH=7 using ammonium hydroxide. Details of the dispersion are given in Table V below.

TABLE V

| Dispersion | |
|---|---|
| Viscosity (cP) | 40 000 |
| PH | 7 |
| FR in dispersion (wt %) | 35.7 |

TABLE V-continued

| Dispersion | |
|---|---|
| Br in dispersion (wt %) | 23.9 |
| $Sb_2O_3$ in dispersion (wt %) | 14.4 |

The FR-245/FR-720 1:1 blend dispersion was smooth, white and had good fluidity. The dispersion was left on a shelf for 6 months and remained stable (no settling was observed) during this period.

EXAMPLE 10

Preparation of a Formulation of FR-245/FR-720 Blend 145 gr. of deionized water and 145 gr. of acrylic binder were added to 198 gr. of dispersion from Example 9. 17 gr. of acrylic thickener was added during mixing and the dispersion was neutralized to pH=7-8 using ammonium hydroxide. Details of the dispersion are given in Table VI below.

TABLE VI

| Dispersion | |
|---|---|
| Viscosity (cP) | 9600 |
| PH | 7-8 |
| FR in dispersion (wt %) | 13.7 |
| Br in dispersion (wt %) | 9.2 |
| $Sb_2O_3$ in dispersion (wt %) | 5.5 |

This formulation contained 38% by weight of binder, 13.7% FR agent and 9.2% bromine content. The FR-245/FR-720 1:1 blend formulation was smooth, white and had good fluidity. The dispersion was left on a shelf for 6 months and remained stable (no settling was observed) during this period.

EXAMPLE 11

Application of FR-245/FR-720 Blend Formulation to Polyester Fabric

Polyester fabric weighing 164 grams per square meter was coated using a knife coater with the formulation from Example 10 to 44% dry add-on and cured. The blend film was transparent and soft. The fabric passed ASTM D 6413-99 with negligible dripping. The fabric was translucent with no visible streak marks.

While examples of the invention have been described for purposes of illustration, it will be apparent that many modifications, variations and adaptations can be carried out by persons skilled in the art, without exceeding the scope of the claims.

The invention claimed is:

1. An aqueous flame retarding dispersion useful for imparting a smooth, translucent, and non streaky coating to textiles, and for providing a satisfactory flame retardancy (according to ASTM D 6413-99 or other applicable standards) with less than 60% dry add-on by weight of said textile, said dispersion consisting of:
   a) a flame retardant selected from among tris(tribromophenoxy)-s-triazine, tetrabromobisphenol A bis(2,3-dibromopropyl ether), and a mixture thereof;
   b) one or more flame-retardant synergist(s);
   c) one or more nonionic or anionic surface-active agent(s) and/or wetting agent(s); and
   d) one or more polymeric binder(s) selected from the group consisting of polymer latex emulsions of co-monomers selected from the group consisting of acrylic acids and their esters, nitrite and amide derivatives, methacrylic acids and their esters, vinyl esters of saturated C1-C8-carboxylic acids, styrenes, and any combinations thereof;
   ii) vinyl esters of saturated $C_1$-$C_{18}$-carboxylic acids;
   iii) styrenes;
   iv) copolymer of acrylonitrile-butadiene-styrene;
   v) polychloroprene rubber;
   vi) carboxylated styrene butadiene rubber;
   vii) polyurethanes; and
   viii) any combinations thereof;
   wherein said dispersion contains 30% or less of said polymeric binder(s) by weight.

2. The dispersion of claim 1, wherein the nonionic surface-active agent is selected from the group consisting of polyoxyethylene (POE) alkyl ether type, nonylphenol ethoxylate, 6 ethyleneoxide units (NP-6), free acids or organic phosphate esters, dioctyl ester of sodium sulfosuccinic acid, and combinations thereof.

3. The dispersion of claim 1, wherein the flame-retardant synergist is antimony oxide.

4. The dispersion of claim 1, wherein the acrylic acid and methacrylic acid co-monomers are selected from the group consisting of
   methyl acrylate,
   ethyl acrylate,
   ethyl methacrylate,
   propyl acrylate,
   propyl methacrylate,
   butyl acrylate,
   isobutyl acrylate,
   isobutyl methacrylate,
   amyl acrylate,
   2-ethylhexyl acrylate,
   cyclohexyl acrylate,
   vinyl acrylate,
   allyl acrylate,
   hydroxyethyl acrylate,
   perfluoroethyl acrylate,
   isobornyl acrylate,
   phenoxyethyl acrylate,
   tetraethylene glycol diacrylate,
   tripropylene glycol diacrylate,
   trimethylolpropane triacrylate,
   stearyl acrylate
   stearyl methacrylate,
   acrylamide,
   methacrylamide,
   N—($C_1$-$C_8$)-alkyl acrylamides,
   N—($C_1$-$C_8$)-alkyl methacrylamides,
   phenoxyethyl acrylate,
   hydroxyalkylene monoacrylic esters of ethoxylated $C_1$-$C_8$ alcohols, hydroxyalkylene monomethacrylic esters of ethoxylated $C_1$-$C_8$ alcohols, acrylic esters of ethoxylated $C_1$-$C_8$ alcohols, and methacrylic esters of ethoxylated $C_1$-$C_8$ alcohols
   acrylic esters of ethoxylated $C_1$-$C_{18}$ alcohols,
   methacrylic esters of ethoxylated $C_1$-$C_{18}$ alcohols and;
   co-monomers of two or more of said acrylic and methacrylic acid co-monomers, and
   wherein when the polymeric binder is vinyl esters of saturated $C_1$-$C_{18}$-carboxylic acids, then the co-monomers are selected from the group consisting of vinyl acetate, vinyl propionate, vinyl butyrate, and vinyl stearate.

5. The dispersion of claim 1, wherein said dispersion comprises 27% or less polymeric binder(s) by weight.

* * * * *